United States Patent
Wu et al.

(10) Patent No.: US 9,407,165 B2
(45) Date of Patent: Aug. 2, 2016

(54) CASCADE BRIDGE-TYPE DC-AC POWER CONVERSION METHOD AND CONVERTER DEVICE THEREOF

(71) Applicant: Ablerex Electronics Co., Ltd., New Taipei (TW)

(72) Inventors: Chin-Chang Wu, Kaohsiung (TW); Wen-Jung Chiang, Kaohsiung (TW); Chien-Ming Huang, Kaohsiung (TW); Wen-Jie Hou, Kaohsiung (TW)

(73) Assignee: Ablerex Electronics Co., Ltd., New Taipei (TW)

( * ) Notice: Subject to any disclaimer, the term of this patent is extended or adjusted under 35 U.S.C. 154(b) by 205 days.

(21) Appl. No.: 14/227,233

(22) Filed: Mar. 27, 2014

(65) Prior Publication Data

US 2014/0301124 A1    Oct. 9, 2014

(30) Foreign Application Priority Data

Apr. 3, 2013 (TW) .............................. 102112067 A

(51) Int. Cl.
*H02M 5/14* (2006.01)
*H02M 7/49* (2007.01)
*H02M 5/08* (2006.01)

(52) U.S. Cl.
CPC ........ *H02M 7/49* (2013.01); *H02M 5/14* (2013.01); *H02M 5/08* (2013.01)

(58) Field of Classification Search
CPC .............. H02M 7/483; H02M 2007/4835; H02M 7/487; H02M 7/49; H02M 5/005; H02M 5/06; H02M 5/08; H02M 5/14
See application file for complete search history.

(56) References Cited

U.S. PATENT DOCUMENTS

| 7,138,789 B2 | 11/2006 | Moussaoui et al. |
| 7,518,886 B1 * | 4/2009 | Lai ............................ H02P 8/12 363/17 |
| 7,710,748 B2 | 5/2010 | Young |
| 2004/0071002 A1 * | 4/2004 | Rosenbaum ...... H02M 7/53871 363/98 |
| 2011/0157928 A1 * | 6/2011 | Ku .......................... H02J 3/383 363/37 |
| 2011/0280049 A1 * | 11/2011 | Mori .................... H02M 1/4216 363/25 |

FOREIGN PATENT DOCUMENTS

TW    I337444 B    2/2011

* cited by examiner

*Primary Examiner* — Jeffrey Gblende
(74) *Attorney, Agent, or Firm* — Alan D. Kamrath; Kamrath IP Lawfirm, P.A.

(57) ABSTRACT

A cascade bridge-type DC-AC power converter device includes a low-frequency bridge-type power converter including an AC terminal and a DC bus and a high-frequency bridge-type power converter including an AC terminal. A power conversion method includes: serially connecting the AC terminal of the high-frequency bridge-type power converter and the AC terminal of the low-frequency bridge-type power converter; operating frequency of the low-frequency bridge-type power converter synchronized with frequency of an AC source; and operating the high-frequency bridge-type power converter with high-frequency PWM to generate a multilevel AC voltage. A DC power source connects to the DC bus of the low-frequency bridge-type power converter. No additional power supply circuit will be required for power supply to a DC bus of the high-frequency bridge-type power converter. Accordingly, the power circuit is simplified, and the manufacturing cost is reduced.

20 Claims, 7 Drawing Sheets

CASCADE BRIDGE-TYPE DC-AC POWER CONVERSION METHOD AND CONVERTER DEVICE THEREOF

BACKGROUND OF THE INVENTION

1. Field of the Invention

The present invention relates to a cascade bridge-type DC-AC power conversion method and converter device thereof. More particularly, the present invention relates to the cascade bridge-type DC-AC power conversion method and converter device thereof for enhancing the efficiency of power conversion.

2. Description of the Related Art

Recently, several new energy sources (i.e. solar energy, wind energy and fuel cells) have been widely developed in power generation to reduce relying on the power of fossil fuels, the effect of environment pollutions and global warming. Most power generation systems of the new energy sources connect parallel and supply to a power distribution network. However, these new power generation systems supply DC power. DC power generated from the new energy sources must be converted into AC power by a DC-AC power converter, such that the power generation systems can supply high-quality AC power. Furthermore, the DC-AC power converter must be designed with circuitry in enhancing the efficiency of power conversion, reducing the dimensions and lowering manufacture costs.

For example, TAIWANESE PATENT PUBLICATION No. 1337444 entitled "Cascade Power Converter", U.S. PATENT PUBLICATION No. 20080031014 entitled "AC/DC Converter Comprising Plural Converters" and U.S. PATENT PUBLICATION No. 20050156579 entitled "Multiphase Converter with Zero Voltage Switching" disclose various power converters. The above-mentioned patents and publications are incorporated herein by reference for purposes including, but not limited to, indicating the background of the present invention and illustrating the state of the art.

A conventional DC-AC converter device mostly comprises a bridge type structure including a single phase structure and a three-phase structure which are applied in a single phase distribution power system and a three-phase distribution power system, respectively. A conventional bridge-type DC-AC converter device employs pulse width modulation (PWM) technology to control power electronic switches of the bridge-type DC-AC converter device, thereby generating a PWM voltage. However, these power electronic switches do not have an ideal characteristic, so that the switching operation of the power electronic switches will cause power loss. The switching power loss will reduce the efficiency of power conversion of the DC-AC converter device. The switching power loss is determined by currents in the power electronic switches, switching voltages and switching frequencies of the power electronic switches.

In order to reduce the switching power loss, a switching voltage of the power electronic switch must be selectively reduced. Hence, recently, a multi-level DC-AC converter device was developed in effectively reducing each switching voltage of the power electronic switches to generate an output of multi-level AC voltages and thus to reduce the switching power loss. Moreover, high-frequency harmonics of the multi-level AC voltages are relatively small, so that the capacity of filters located at an output terminal, the power loss of the filters and the amount of electromagnetic interference (EMI) can be reduced.

In general, a topology of the conventional multi-level DC-AC converter device mainly includes a diode-clamped type, a flying-capacitor type and a cascade bridge type. Each type of the above conventional multi-level DC-AC converter devices has its own advantages and defects. For example, the cascade bridge type includes a plurality of bridge-type DC-AC power converters cascaded, such that the topology of the cascade bridge-type DC-AC power converter device is relatively simple while generating the same levels of output voltages. However, the topology of the conventional cascade bridge-type DC-AC power converter device has an unavoidable defect of adopting several DC sources which has no common point to connect to each DC bus of each bridge-type DC-AC power converter. If the multi-level cascade bridge-type DC-AC power converter device is applied in a single new energy source, a series of additional circuits must be added to generate other DC sources required by the rest bridge-type. DC-AC power converters. Accordingly, this results in a complicated circuit and an increase of manufacturing cost. Furthermore, the power electronic switches of each bridge-type DC-AC power converter must be controlled by high-frequency PWM which further results in a complication of the driving circuit and a higher switching power loss. Hence, there is a need of improving the cascade bridge-type DC-AC power converter device.

As is described in greater detail below, the present invention provides a cascade bridge-type DC-AC power conversion method and converter device thereof. A high-frequency bridge-type power converter and a low-frequency bridge-type power converter are connected in cascade to generate a multi-level AC voltage to reduce a capacity of an output filter. Voltages of DC buses of the bridge-type power converters are asymmetric. The bridge-type power converter with a low voltage of a DC bus is controlled by high-frequency PWM, and the bridge-type power converter with a high voltage of a DC bus is synchronously switched by a frequency identical with that of an AC voltage of a distribution power system. Advantageously, the switching power loss is reduced, the driving circuit is simplified, and the efficiency of power conversion is increased in such a way to mitigate and overcome the above problem. In addition, the cascade bridge-type DC-AC power converter device only requires one DC source circuit to connect to a DC bus of the low-frequency bridge-type power converter, and no additional circuit is required to be performed as a DC source to connect to a DC bus of the high-frequency bridge-type power converter.

SUMMARY OF THE INVENTION

The primary objective of this invention is to provide a cascade bridge-type DC-AC power conversion method and converter device thereof. The cascade bridge-type DC-AC power converter device connects between a DC power source circuit and a distribution power system. The cascade bridge-type DC-AC power converter device is operated to convert an electric power supplied from the DC power source circuit into an AC power with a multi-level AC voltage which is injected into the distribution power system. Advantageously, the present invention is accordingly successful in reducing the switching power loss of the cascade bridge-type DC-AC power converter device, lowering the capacity of filters located at an output terminal of the cascade bridge-type DC-AC power converter device and reducing the power loss in the filters to increase the efficiency of power conversion, and to reduce total dimensions and manufacturing cost.

The cascade bridge-type DC-AC power conversion method in accordance with an aspect of the present invention includes:

connecting a low-frequency bridge-type power converter and a high-frequency bridge-type power converter between a DC power source circuit and a distribution power system;

providing a first AC terminal of the low-frequency bridge-type power converter and a second AC terminal of the high-frequency bridge-type power converter, and serially connecting the first AC terminal of the low-frequency bridge-type power converter to the second AC terminal of the high-frequency bridge-type power converter to form a cascade bridge-type DC-AC power converter device;

operating the low-frequency bridge-type power converter with a switching frequency identical with a frequency of an AC voltage of the distribution power system; and operating the high-frequency bridge-type power converter with a high-frequency PWM to generate a multi-level AC voltage from the cascade bridge-type DC-AC power converter device.

The cascade bridge-type DC-AC power converter device in accordance with a separate aspect of the present invention includes:

a DC input port connecting to a DC power source circuit;

a low-frequency bridge-type power converter including a first AC terminal and a first DC bus, with the first DC bus connecting to the DC input port;

a high-frequency bridge-type power converter including a second AC terminal and a second DC bus, with the first AC terminal of the low-frequency bridge-type power converter serially connected to the second AC terminal of the high-frequency bridge-type power converter; and an AC output port connecting to a distribution power system.

The low-frequency bridge-type power converter is synchronously operated with a switching frequency identical with a frequency of an AC voltage of the distribution power system, and the high-frequency bridge-type power converter is operated with a high-frequency PWM to generate a multi-level AC voltage from the cascade bridge-type DC-AC power converter device.

In a separate aspect of the present invention, a DC voltage of the first DC bus of the low-frequency bridge-type power converter is controlled by regulating a DC voltage of the second DC bus of the high-frequency bridge-type power converter.

In a further separate aspect of the present invention, the cascade bridge-type DC-AC power converter device is applied to a single DC power source circuit.

In yet a further separate aspect of the present invention, the single DC power source circuit connects to the DC input port to supply DC electric power to the cascade bridge-type DC-AC power converter device via the first DC bus of the low-frequency bridge-type power converter.

In yet a further separate aspect of the present invention, a voltage of the second DC bus of the high-frequency bridge-type power converter is lower than that of the first DC bus of the low-frequency bridge-type power converter.

In yet a further separate aspect of the present invention, the low-frequency bridge-type power converter and the high-frequency bridge-type power converter are selected from a single-phase full-bridge power converter.

In yet a further separate aspect of the present invention, the second DC bus of the single-phase full-bridge power converter of the high-frequency bridge-type power converter only connects to a capacitor which is performed as a power buffer.

In yet a further separate aspect of the present invention, a voltage of the second DC bus of the high-frequency bridge-type power converter is higher than or equals a half voltage of the first DC bus of the low-frequency bridge-type power converter.

In yet a further separate aspect of the present invention, the switching frequency of power electronic switches of the low-frequency bridge-type power converter is synchronized with that of a voltage of a single-phase distribution power system to generate a three-level AC voltage whose frequency is identical with that of the voltage of a single-phase distribution power system.

In yet a further separate aspect of the present invention, the low-frequency bridge-type power converter is selected from a three-phase bridge-type power converter, and the high-frequency bridge-type power converter includes two or three single-phase full-bridge power converters.

In yet a further separate aspect of the present invention, DC buses of the two or three single-phase full-bridge power converters of the high-frequency bridge-type power converter only connect to capacitors which are performed as a power buffer.

In yet a further separate aspect of the present invention, a voltage of the second DC bus of the high-frequency bridge-type power converter is higher than or equals one-third voltage of the first DC bus of the low-frequency bridge-type power converter.

In yet a further separate aspect of the present invention, the switching frequency of power electronic switches of the low-frequency bridge-type power converter is synchronized with that of a voltage of a three-phase three-wire distribution power system.

In yet a further separate aspect of the present invention, the low-frequency bridge-type power converter is selected from a three-phase diode-clamping multi-phase power converter, and the high-frequency bridge-type power converter includes three single-phase full-bridge power converters.

In yet a further separate aspect of the present invention, DC buses of the three single-phase full-bridge power converters of the high-frequency bridge-type power converter only connect to capacitors which are performed as power buffers.

In yet a further separate aspect of the present invention, a voltage of the second DC bus of the high-frequency bridge-type power converter is higher than or equals one-fourth voltage of the first DC bus of the low-frequency bridge-type power converter.

In yet a further separate aspect of the present invention, the switching frequency of power electronic switches of the low-frequency bridge-type power converter is synchronized with that of a voltage of a three-phase four-wire distribution power system.

In yet a further separate aspect of the present invention, power electronic switches of the high-frequency bridge-type power converter are controlled by high-frequency unipolar PWM for generating a high-frequency three-level pulse voltage.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a cascade bridge-type DC-AC power conversion method and converter device thereof in accordance with the preferred embodiments of the present invention can be applicable to various DC-AC power converter devices, which is not limitative of the present invention. The cascade bridge-type DC-AC power converter device in accordance with the preferred embodiments of the present invention is suitable for a single DC power source circuit and various distribution power systems, for example: including a single-phase distribution power system, a three-phase three-wire distribution power system or a three-phase four-wire distribution power system.

Figure 1:
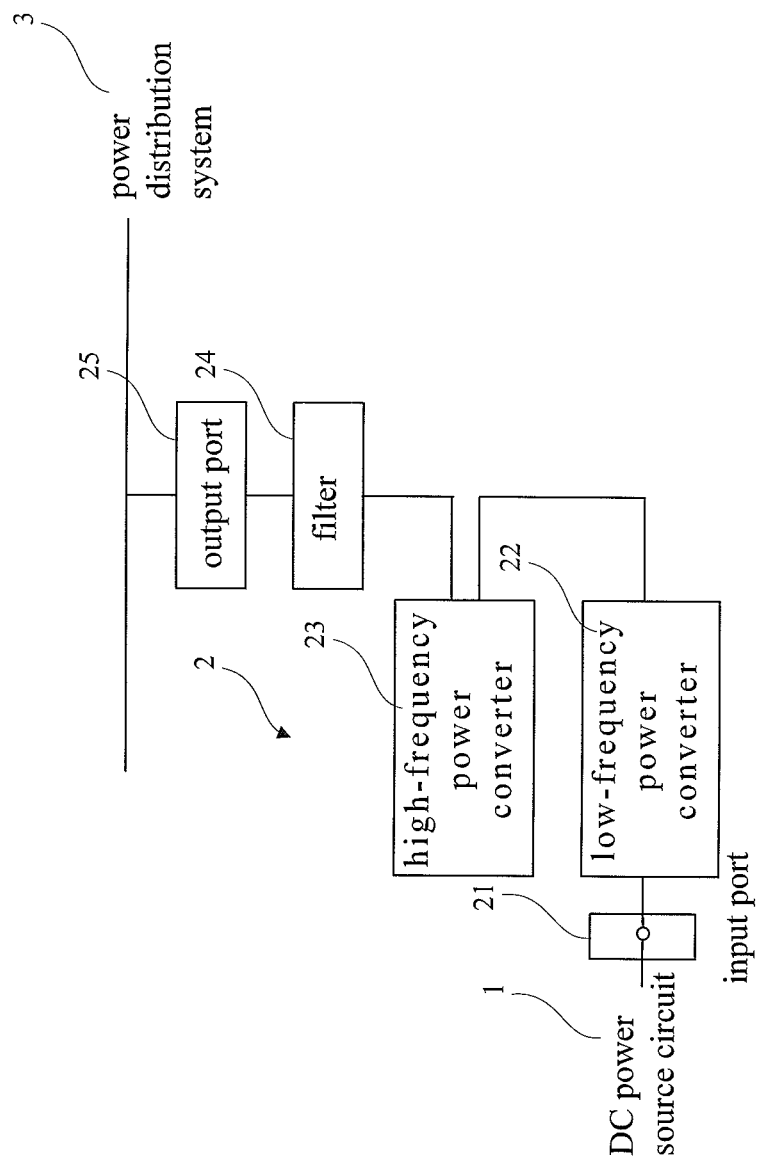
FIG. 1 is a schematic block diagram of a structure of a cascade bridge-type DC-AC power converter device in accordance with a preferred embodiment of the present invention.

FIG. 1 shows a structure of a cascade bridge-type DC-AC power converter device in accordance with a preferred embodiment of the present invention, which is not limitative of the present invention. Referring to FIG. 1, the cascade bridge-type DC-AC power converter device 2 connects between a DC power source circuit 1 and a distribution power system 3. The DC power source circuit 1 includes a DC power source and a conversion circuit which is capable of providing DC power energy. The cascade bridge-type DC-AC power converter device 2 is operated to convert the DC power outputted from the DC power source circuit 1 into an AC power which is injected into the distribution power system 3 or the like.

Still referring to FIG. 1, the cascade bridge-type DC-AC power converter device 2 includes a DC input port 21, a low-frequency bridge-type power converter 22, a high-frequency bridge-type power converter 23, a filter (or filtering circuit) 24 and an AC output port 25. The DC input port 21 connects to the DC power source circuit 1. The low-frequency bridge-type power converter 22 has a first DC bus and a first AC terminal, while the high-frequency bridge-type power converter 23 has a second DC bus and a second AC terminal.

Still referring to FIG. 1, the cascade bridge-type DC-AC power conversion method includes: arranging or connecting the low-frequency bridge-type power converter 22 and the high-frequency bridge-type power converter 23 between the DC power source circuit 1 and the distribution power system 3; and providing a serial connection of the first AC terminal of the low-frequency bridge-type power converter 22 and the second AC terminal of the high-frequency bridge-type power converter 23.

Still referring to FIG. 1, the DC input port 21 electrically connects to the first DC bus of the low-frequency bridge-type power converter 22, the first AC terminal of the low-frequency bridge-type power converter 22 serially connects to the second AC terminal of the high-frequency bridge-type power converter 23, and a connection point therebetween further electrically connects to the AC output port 25 via the filter 24. Finally, the AC output port 25 electrically connects to the distribution power system 3.

Still referring to FIG. 1, the cascade bridge-type DC-AC power conversion method further includes: operating the low-frequency bridge-type power converter 22 with a switching frequency identical with a frequency of an AC voltage of the distribution power system 3 for a synchronously switching operation; and operating the high-frequency bridge-type power converter 23 with a high-frequency PWM to generate a multi-level AC voltage from the cascade bridge-type DC-AC power converter device 2 (i.e. a combination or a serial connection of the low-frequency bridge-type power converter 22 and the high-frequency bridge-type power converter 23).

With continued reference to FIG. 1, a voltage of the second DC bus of the high-frequency bridge-type power converter 23 is lower than that of the first DC bus of the low-frequency bridge-type power converter 22 while synchronously operating the low-frequency bridge-type power converter 22 with a switching frequency identical with a frequency of an AC voltage of the distribution power system 3 and further operating the high-frequency bridge-type power converter 23 with a high-frequency PWM. Advantageously, the cascade bridge-type DC-AC power converter device 2 is effective in reducing a switching voltage of power electronic switches in high-frequency switching, thereby reducing switching power loss and increasing the efficiency of power conversion. Furthermore, since the values of the voltages of the second DC bus of the high-frequency bridge-type power converter 23 and the first DC bus of the low-frequency bridge-type power converter 22 are appropriately arranged, no real power is input or output at the high-frequency bridge-type power converter 23, and all of the real power will be output via the low-frequency bridge-type power converter 22. Consequently, no additional DC power supply circuit is required connecting to the second DC bus of the high-frequency bridge-type power converter 23. The cascade bridge-type DC-AC power converter device 2 only requires a single DC power source circuit supplying DC power to the first DC bus of the low-frequency bridge-type power converter 22, and no additional DC power supply circuit will be required for supplying DC power to the second DC bus of the high-frequency bridge-type power converter 23. Advantageously, the cascade bridge-type DC-AC power converter device 2 is successful in increasing the flexibility of the design and operation, simplifying the structure of the entire circuit and reducing the manufacturing cost.

Figure 2:
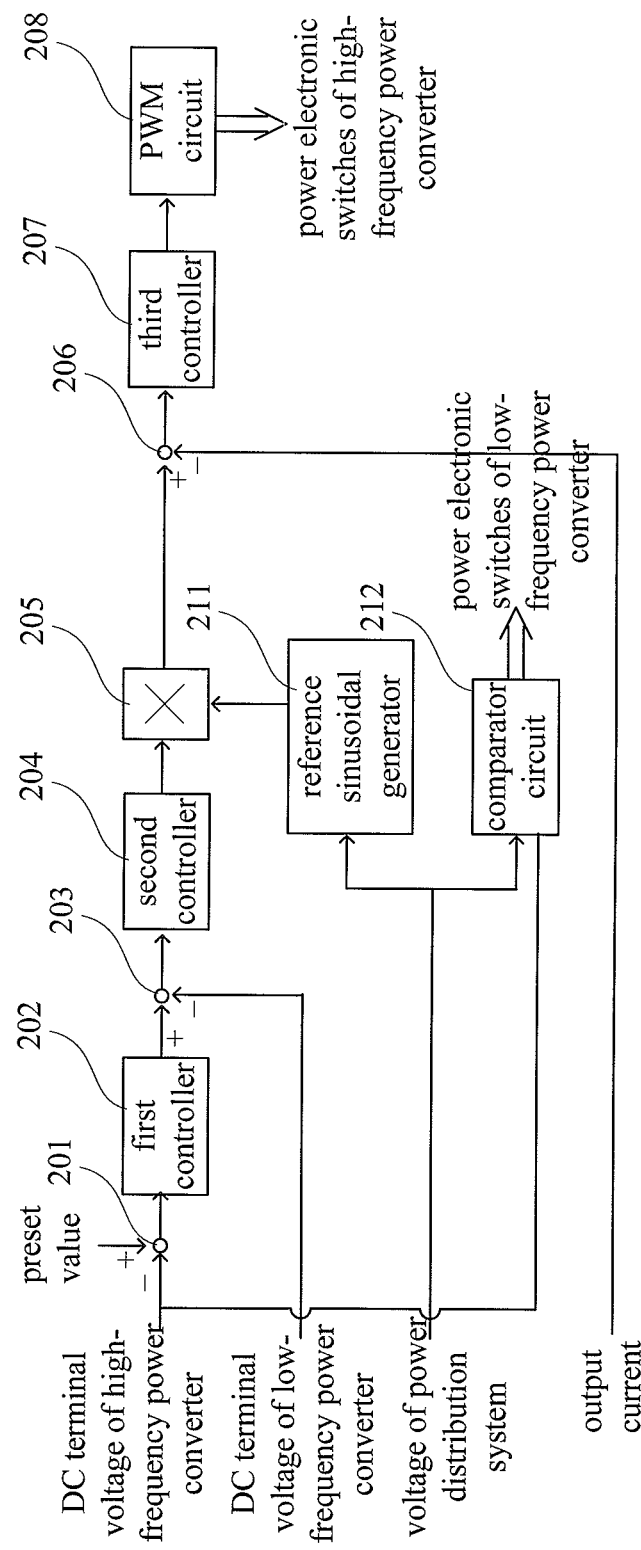
FIG. 2 is a schematic block diagram of a controller applied in the cascade bridge-type DC-AC power converter device in accordance with the preferred embodiment of the present invention.

FIG. 2 shows a controller applied in the cascade bridge-type DC-AC power converter device in accordance with the preferred embodiment of the present invention which corresponds to the cascade bridge-type DC-AC power converter device 2 in FIG. 1. Referring to FIGS. 1 and 2, the cascade bridge-type DC-AC power converter device 2 is applied to stabilize an output voltage of the DC power source circuit 1. The voltage of the second DC bus of the high-frequency bridge-type power converter 23 is sent to a first subtractor 201 for subtracting from a preset value, and a result of the first subtractor 201 is further sent to a first controller 202 whose output is a reference voltage of the low-frequency bridge-type power converter 22. The voltage of the first DC bus of the low-frequency bridge-type power converter 22 is detected. An output of the first controller 202 and the detected voltage of the first DC bus of the low-frequency bridge-type power converter 22 are sent to a second subtractor 203 for subtracting them, and a result of the second subtractor 203 is further sent to a second controller 204 for determining an amplitude of an output current of the cascade bridge-type DC-AC power converter device 2.

Still referring to FIGS. 1 and 2, the voltage of the distribution power system 3 is detected and sent to a reference sinusoidal generator 211 to generate a unity sinusoidal signal which is synchronized with the voltage of the distribution power system 3. Outputs of the second controller 204 and the reference sinusoidal generator 211 are sent to a multiplier 205 for multiplying them, and a result of the multiplier 205 is a reference signal of an output current of the cascade bridge-type DC-AC power converter device 2. The output current of the cascade bridge-type DC-AC power converter device 2 is further detected. The detected output current of the cascade bridge-type DC-AC power converter device 2 and an output of the multiplier 205 are sent to a third subtractor 206 for subtracting them, and a result of the third subtractor 206 is further sent to a third controller 207. An output of the third controller 207 is sent to a PWM circuit 208, thereby generating a control signal for the power electronic switches of the high-frequency bridge-type power converter 23. The detected voltage of the distribution power system 3 and the voltage of the second DC bus of the high-frequency bridge-type power converter 23 are sent to a comparator circuit 212, thereby generating a control signal for the power electronic switches of the low-frequency bridge-type power converter 22. Accordingly, the switching frequency of the power electronic switches of the low-frequency bridge-type power converter 22 is synchronous and identical with a frequency of the distribution power system 3.

Figure 3:
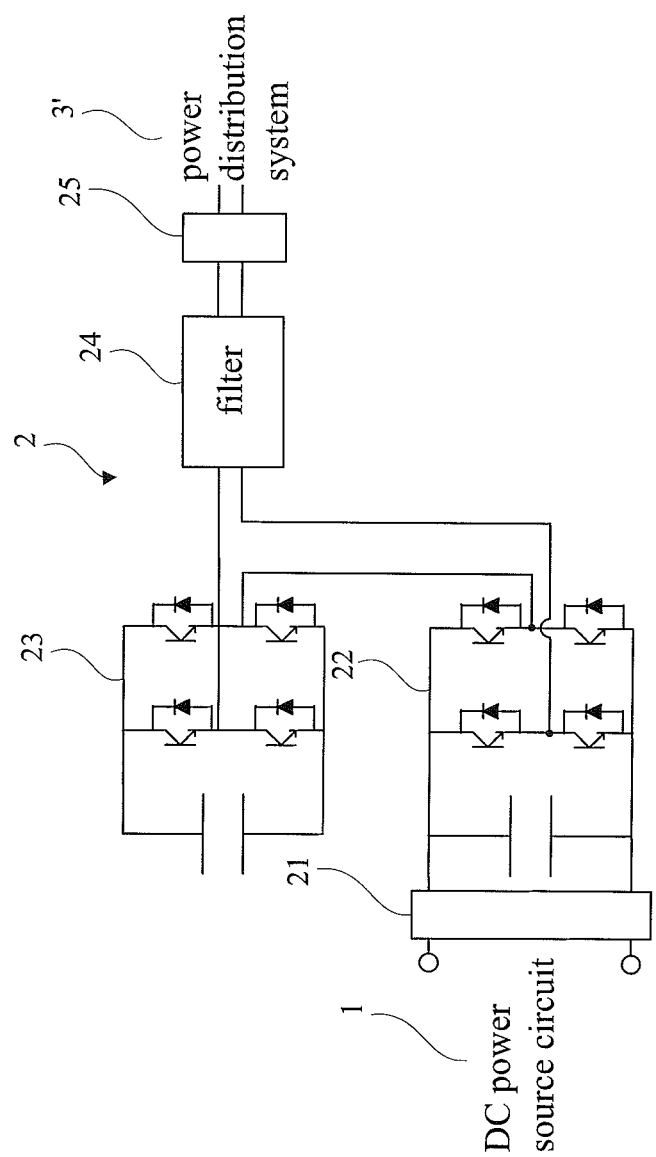
FIG. 3 is a schematic diagram of the cascade bridge-type DC-AC power converter device in accordance with a first preferred embodiment of the present invention.

FIG. 3 shows the cascade bridge-type DC-AC power converter device in accordance with a first preferred embodiment of the present invention which corresponds to the cascade bridge-type DC-AC power converter device 2 in FIG. 1. Referring now to FIGS. 1 and 3, in the first embodiment, the DC input port 21 of the cascade bridge-type DC-AC power converter device 2 connects to the DC power source circuit 1, while the AC output port 25 of the cascade bridge-type DC-AC power converter device 2 connects to a single-phase distribution power system 3'. The low-frequency bridge-type power converter 22 and the high-frequency bridge-type power converter 23 are selected from a single-phase full-bridge power converter. The second DC bus of the high-frequency bridge-type power converter 23 only connects to a capacitor which is performed as a power buffer. Furthermore, a voltage of the second DC bus of the high-frequency bridge-type power converter 23 is higher than or equals a half voltage of the first DC bus of the low-frequency bridge-type power converter 22. The switching frequency of the power electronic switches of the low-frequency bridge-type power converter 22 is synchronized with a frequency of the single-phase distribution power system 3' to thereby generate a three-level AC voltage. Power electronic switches of the high-frequency bridge-type power converter 23 are controlled by unipolar PWM to thereby generate a high-frequency three-level pulse voltage. Output voltages of the low-frequency bridge-type power converter 22 and the high-frequency bridge-type power converter 23 are serially connected and added to form a multi-level AC voltage which is sent to the filter 24 to generate a sinusoidal output current injected into the single-phase distribution power system 3'. Consequently, the DC power supplied from the DC power source circuit 1 is converted into an AC current injected into the single-phase distribution power system 3'.

Referring back to FIGS. 1, 2 and 3, in the first embodiment, the controller shown in FIG. 2 is applied to control the voltage of the second DC bus of the high-frequency bridge-type power converter 23 to adjust the voltage of the first DC bus of the low-frequency bridge-type power converter 22 and thus to control the amplitude of the output current of the cascade bridge-type DC-AC power converter device 2. Since the values of the voltages of the first DC bus of the low-frequency bridge-type power converter 22 and the second DC bus of the high-frequency bridge-type power converter 23 are appropriately arranged, no real power is input or output at the high-frequency bridge-type power converter 23, and all of the real power will be output via the low-frequency bridge-type power converter 22. No additional DC power source or DC power supply circuit is required connecting to the high-frequency bridge-type power converter 23. The cascade bridge-type DC-AC power converter device 2 only requires a single DC power source circuit supplying the DC power to the low-frequency bridge-type power converter 22. In comparison with the requirement of multiple DC power sources or DC power supply circuits for the conventional cascade bridge-type DC-AC power converter, the present invention is successful in simplifying the structure of the entire circuit and reducing the manufacturing cost. Furthermore, only the high-frequency bridge-type power converter 23 with the lower DC bus voltage is operated in high-frequency switching, so that the present invention is successful in reducing the switching power loss, increasing the efficiency of power conversion of the cascade bridge-type DC-AC power converter device 2 and simplifying the driving circuit of the low-frequency bridge-type power converter 22. Additionally, the cascade bridge-type DC-AC power converter device 2 outputs a multi-level AC voltage, such that the present invention is successful in reducing dimensions of the filter 24 and degrees of electromagnetic interferences thereof.

Figure 4A:
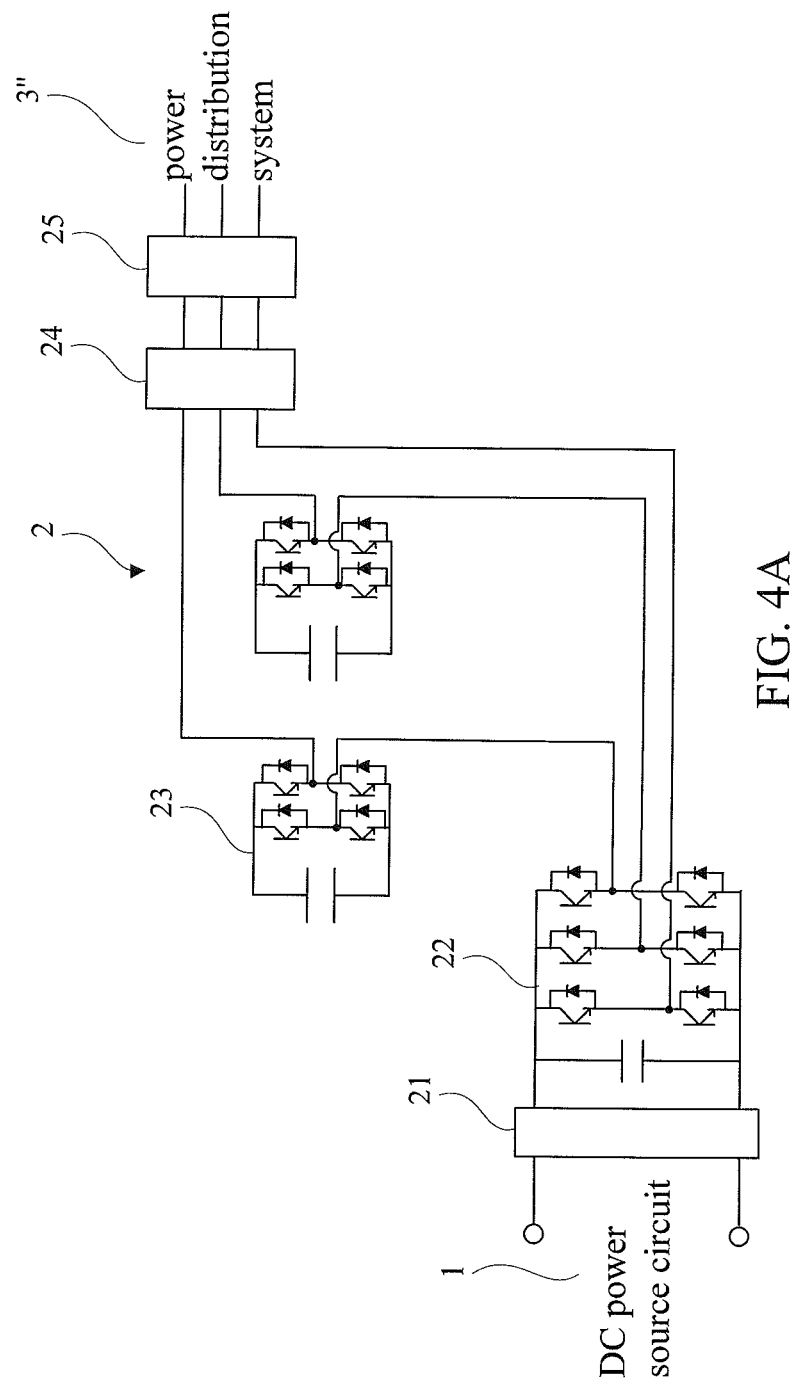
FIG. 4A is a schematic diagram of the cascade bridge-type DC-AC power converter device in accordance with a second preferred embodiment of the present invention.

FIG. 4A shows the cascade bridge-type DC-AC power converter device in accordance with a second preferred embodiment of the present invention which corresponds to the cascade bridge-type DC-AC power converter device 2 in FIG. 1. Referring now to FIGS. 1 and 4A, in the second embodiment, the DC input port 21 of the cascade bridge-type DC-AC power converter device 2 connects to the DC power source circuit 1, while the AC output port 25 of the cascade bridge-type DC-AC power converter device 2 connects to a three-phase three-wire distribution power system 3". The low-frequency bridge-type power converter 22 is selected from a three-phase bridge-type power converter and the high-frequency bridge-type power converter 23 includes two single-phase full-bridge power converters. The second DC buses of the two single-phase full-bridge power converters of the high-frequency bridge-type power converter 23 only connect to capacitors which are performed as power buffers. Furthermore, the voltage of the second DC bus of the high-frequency bridge-type power converter 23 is higher than or equals the one-third voltage of the first DC bus of the low-frequency bridge-type power converter 22. The switching frequency of the power electronic switches of the low-frequency bridge-type power converter 22 is synchronized with a frequency of the three-phase three-wire distribution power system 3" to thereby generate a three-phase AC voltage. The power electronic switches of the high-frequency bridge-type power converter 23 are controlled by unipolar PWM to thereby generate the high-frequency three-level pulse voltage. The output voltages of the low-frequency bridge-type power converter 22 and the high-frequency bridge-type power converter 23 are serially connected and added to form the multi-level AC voltage which is sent to the filter 24 to generate the sinusoidal output current injected into the three-phase three-wire distribution power system 3'''. Consequently, the DC power supplied from the DC power source circuit 1 is converted into the AC current injected into the three-phase three-wire distribution power system 3'''.

Referring back to FIGS. 1, 2 and 4A, in the second embodiment, the controller shown in FIG. 2 is applied to control the voltage of the second DC bus of the high-frequency bridge-type power converter 23 to adjust the voltage of the first DC bus of the low-frequency bridge-type power converter 22 and thus to control the amplitude of the output current of the cascade bridge-type DC-AC power converter device 2. No real power is input or output at the high-frequency bridge-type power converter 23, and all of the real power will be output via the low-frequency bridge-type power converter 22. No additional DC power sources or DC power supply circuits are required connecting to the second DC buses of the high-frequency bridge-type power converter 23. The cascade bridge-type DC-AC power converter device 2 only requires a single DC power source circuit supplying the DC power to the first DC buses of the low-frequency bridge-type power converter 22. In comparison with the requirement of multiple DC power sources or DC power supply circuits for the conventional cascade bridge-type DC-AC power converter, the present invention is successful in simplifying the structure of the entire circuit and reducing the manufacturing cost. Furthermore, only the high-frequency bridge-type power converter 23 with the lower DC bus voltage is operated in high-frequency switching, so that the present invention is successful in reducing the switching power loss, increasing the efficiency of power conversion of the cascade bridge-type DC-AC power converter device 2 and simplifying the driving circuit of the low-frequency bridge-type power converter 22. Additionally, the cascade bridge-type DC-AC power converter device 2 outputs a multi-level AC voltage, such that the present invention is successful in reducing dimensions of the filter 24 and degrees of electromagnetic interferences thereof.

Figure 4B:
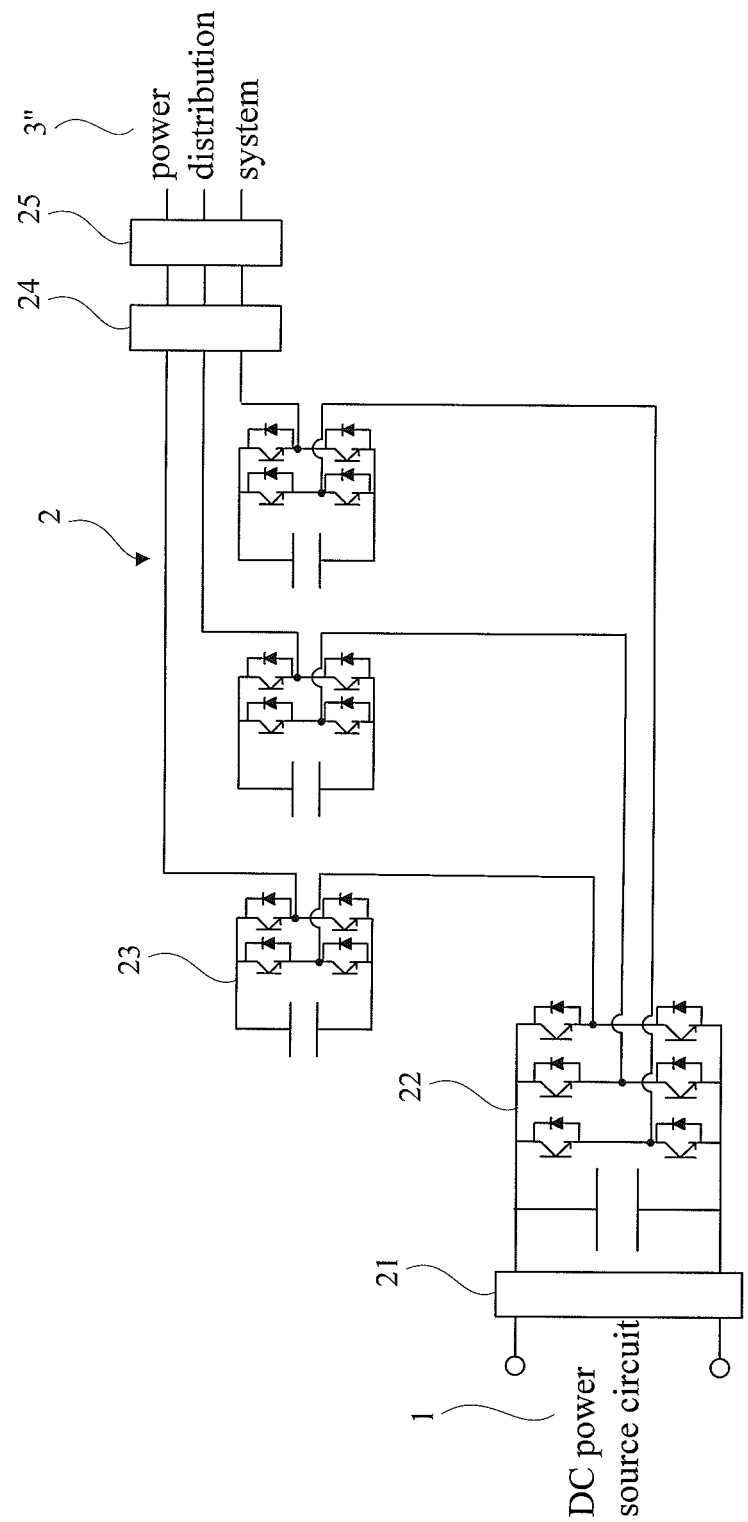
FIG. 4B is a schematic diagram of the cascade bridge-type DC-AC power converter device in accordance with a third preferred embodiment of the present invention.

FIG. 4B shows the cascade bridge-type DC-AC power converter device in accordance with a third preferred embodiment of the present invention which is similar to the cascade bridge-type DC-AC power converter device 2 in FIG. 4A. Referring now to FIGS. 1 and 4B, in the third embodiment, the DC input port 21 of the cascade bridge-type DC-AC power converter device 2 connects to the DC power source circuit 1, while the AC output port 25 of the cascade bridge-type DC-AC power converter device 2 connects to the three-phase three-wire distribution power system 3''. The low-frequency bridge-type power converter 22 is selected from the three-phase bridge-type power converter, and the high-frequency bridge-type power converter 23 includes three single-phase full-bridge power converters. The second DC buses of the three single-phase full-bridge power converters of the high-frequency bridge-type power converter 23 only connect to capacitors which are performed as power buffers.

Figure 5A:
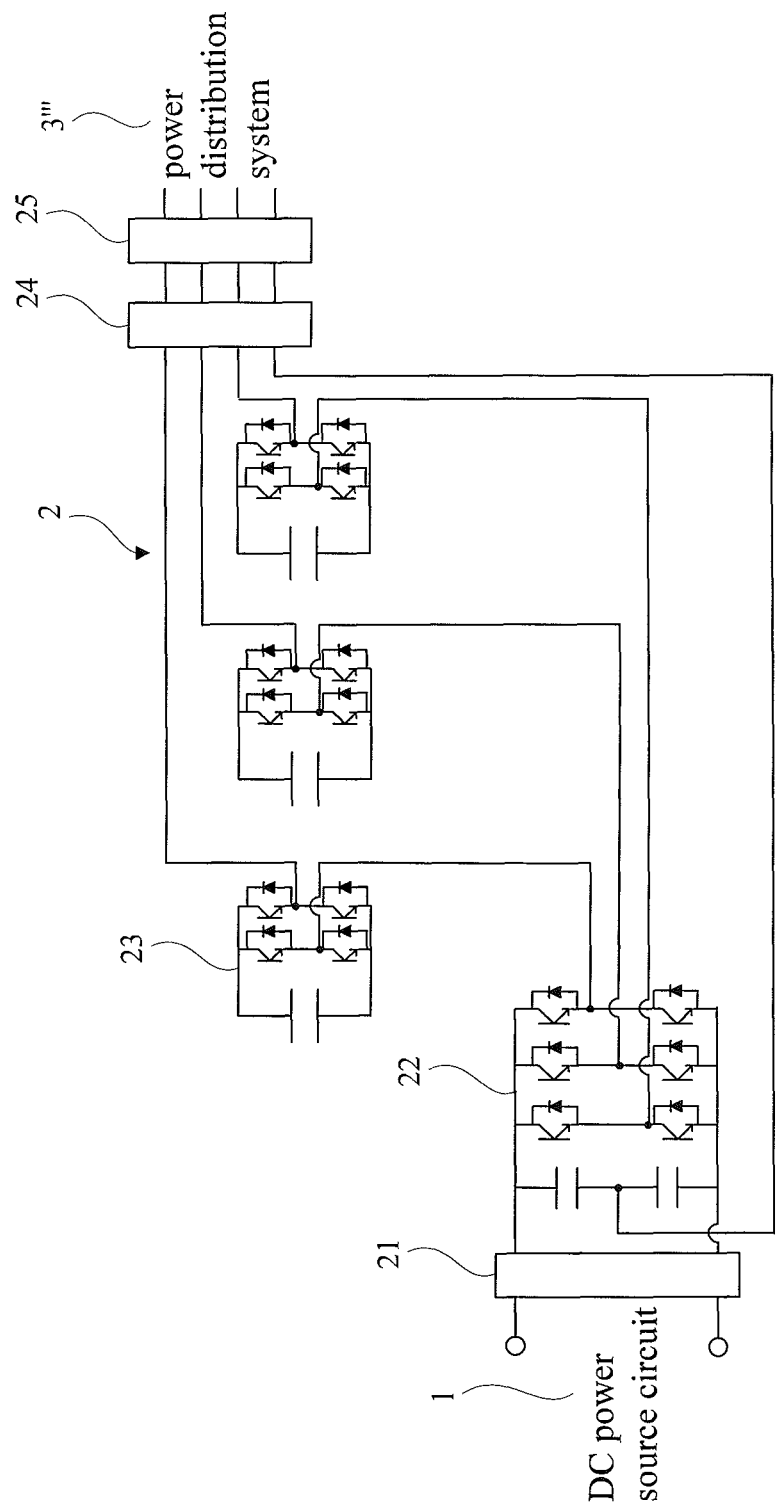
FIG. 5A is a schematic diagram of the cascade bridge-type DC-AC power converter device in accordance with a fourth preferred embodiment of the present invention.

FIG. 5A shows the cascade bridge-type DC-AC power converter device in accordance with a fourth preferred embodiment of the present invention which is similar to the cascade bridge-type DC-AC power converter device 2 in FIG. 4A. Referring now to FIGS. 1 and 5A, in the fourth embodiment, the DC input port 21 of the cascade bridge-type DC-AC power converter device 2 connects to the DC power source circuit 1, while the AC output port 25 of the cascade bridge-type DC-AC power converter device 2 connects to a three-phase four-wire distribution power system 3'''. The low-frequency bridge-type power converter 22 is selected from the three-phase bridge-type power converter, and the high-frequency bridge-type power converter 23 includes three single-phase full-bridge power converters. The second DC buses of the three single-phase full-bridge power converters of the high-frequency bridge-type power converter 23 only connect to capacitors which are performed as power buffers.

Figure 5B:
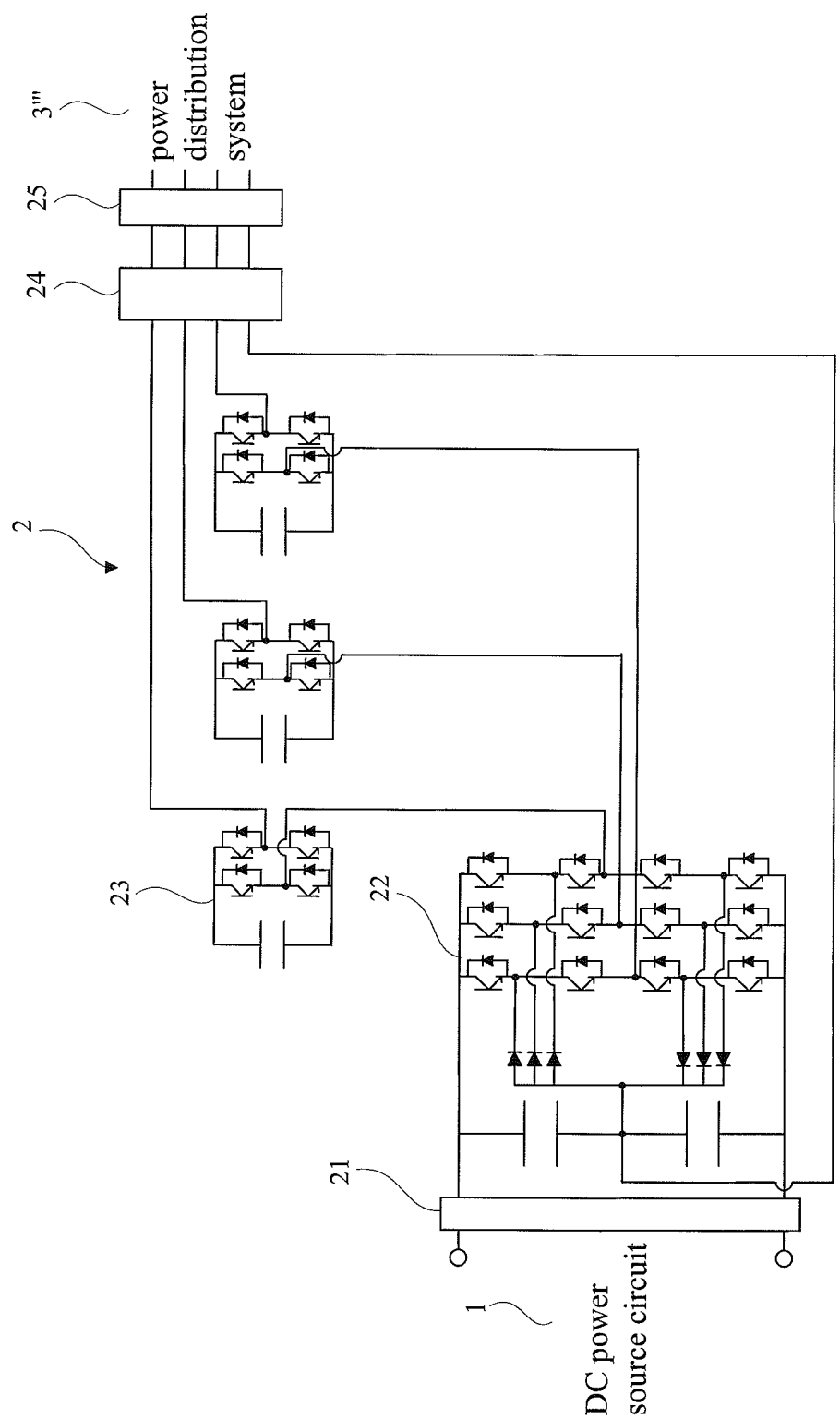
FIG. 5B is a schematic diagram of the cascade bridge-type DC-AC power converter device in accordance with a fifth preferred embodiment of the present invention.

FIG. 5B shows the cascade bridge-type DC-AC power converter device in accordance with a fifth preferred embodiment of the present invention which corresponds to the cascade bridge-type DC-AC power converter device 2 in FIG. 1. Referring now to FIGS. 1 and 5B, in the fifth embodiment, the DC input port 21 of the cascade bridge-type DC-AC power converter device 2 connects to the DC power source circuit 1, while the AC output port 25 of the cascade bridge-type DC-AC power converter device 2 connects to the three-phase four-wire distribution power system 3'''. The low-frequency bridge-type power converter 22 is selected from a three-phase diode-clamping multi-level power converter or other three-phase multi-level power converters, and the high-frequency bridge-type power converter 23 includes three single-phase full-bridge power converters. The second DC buses of the three single-phase full-bridge power converters of the high-frequency bridge-type power converter 23 only connect to capacitors which are performed as power buffers. Furthermore, the voltage of the second DC bus of the high-frequency bridge-type power converter 23 is higher than or equals the one-fourth voltage of the first DC bus of the low-frequency bridge-type power converter 22. It will be understood that other voltage values of the second DC bus of the high-frequency bridge-type power converter 23 are suitably operated. The switching frequency of the power electronic switches of the low-frequency bridge-type power converter 22 is synchronized with a frequency of the three-phase four-wire distribution power system 3''' to thereby generate a three-level AC voltage. The power electronic switches of the high-frequency bridge-type power converter 23 are controlled by high-frequency unipolar PWM for generating the high-frequency three-level pulse voltage. The output voltages of the low-frequency bridge-type power converter 22 and the high-frequency bridge-type power converter 23 are serially connected and added to form the multi-level AC voltage which is sent to the filter 24 to generate the sinusoidal output currents injected into the three-phase four-wire distribution power system 3'''. Consequently, the DC power supplied from the DC power source circuit 1 is converted into the AC current injected into the three-phase four-wire distribution power system 3'''.

Referring back to FIGS. 1, 2 and 5B, in the fifth embodiment, the controller shown in FIG. 2 is applied to control the voltage of the second DC bus of the high-frequency bridge-type power converter 23 to adjust the voltage of the first DC bus of the low-frequency bridge-type power converter 22 and thus to control the amplitude of the output current of the cascade bridge-type DC-AC power converter device 2. Since the values of the voltages of the first DC bus of the low-frequency bridge-type power converter 22 and the second DC bus of the high-frequency bridge-type power converter 23 are appropriately arranged, no real power is input or output at the high-frequency bridge-type power converter 23, and all of the real power will be output via the first DC bus of the low-frequency bridge-type power converter 22. No additional DC power source or DC power supply circuit is required connecting to the high-frequency bridge-type power converter 23. The cascade bridge-type DC-AC power converter device 2 only requires a single DC power source circuit supplying the DC power to the low-frequency bridge-type power converter 22, and three additional DC power sources or DC power supply circuits will be omitted therein. In comparison with the requirement of multiple DC power sources or DC power supply circuits for the conventional cascade bridge-type DC-AC power converter, the present invention is successful in simplifying the structure of the entire circuit and reducing the manufacturing cost. Furthermore, only the high-frequency bridge-type power converter 23 with the lower DC bus voltage is operated in high-frequency switching, so that the present invention is successful in reducing the switching power loss, increasing the efficiency of power conversion of the cascade bridge-type DC-AC power converter device 2 and simplifying the driving circuit of the low-frequency bridge-type power converter 22. Additionally, the cascade bridge-type DC-AC power converter device 2 outputs a multi-level AC voltage, such that the present invention is successful in reducing dimensions of the filter 24 and degrees of electromagnetic interferences thereof.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A cascade bridge-type DC-AC power conversion method comprising:
   connecting a low-frequency bridge-type power converter and a high-frequency bridge-type power converter between a DC power source circuit and a distribution power system;
   providing a first AC terminal and a first DC bus of the low-frequency bridge-type power converter and a second AC terminal and a second DC bus of the high-frequency bridge-type power converter, and serially connecting the first AC terminal of the low-frequency bridge-type power converter to the second AC terminal of the high-frequency bridge-type power converter;
   operating the low-frequency bridge-type power converter with a switching frequency synchronous and identical with a frequency of an AC voltage of the distribution power system;
   operating the high-frequency bridge-type power converter with a high-frequency PWM to generate a multi-level AC voltage from the cascade bridge-type DC-AC power converter device, wherein connecting the low-frequency bridge-type power converter to the high-frequency bridge-type power converter to form a cascade bridge-type DC-AC power converter device, by controlling a voltage of the second DC bus of the high-frequency bridge-type power converter to adjust a voltage of the first DC bus of the low-frequency bridge-type power converter and thus to control an amplitude of an output current of the cascade bridge-type DC-AC power converter device and appropriately arranging values of the voltages of the first DC bus of the low-frequency bridge-type power converter and the second DC bus of the high-frequency bridge-type power converter, and wherein no real power is input or output at the high-frequency bridge-type power converter.

2. The cascade bridge-type DC-AC power conversion method as defined in claim 1, wherein the cascade bridge-type DC-AC power converter device is applied to a single DC power source circuit.

3. The cascade bridge-type DC-AC power conversion method as defined in claim 1, wherein the low-frequency bridge-type power converter and the high-frequency bridge-type power converter are selected from a single-phase full-bridge power converter, with a voltage of the second DC bus of the high-frequency bridge-type power converter higher than or equals a half voltage of the first DC bus of the low-frequency bridge-type power converter, with a switching frequency of power electronic switches of the low-frequency bridge-type power converter synchronized with a frequency of a single-phase distribution power system to thereby generate a single-phase AC voltage.

4. The cascade bridge-type DC-AC power conversion method as defined in claim 1, wherein the low-frequency bridge-type power converter is selected from a three-phase bridge-type power converter and the high-frequency bridge-type power converter includes two or three single-phase full-bridge power converters, with a voltage of the second DC bus of the high-frequency bridge-type power converter higher than or equals an one-third voltage of the first DC bus of the low-frequency bridge-type power converter, with a switching frequency of power electronic switches of the low-frequency bridge-type power converter synchronous with a frequency of a three-phase three-wire distribution power system to thereby generate a three-phase three-wire AC voltage.

5. A cascade bridge-type DC-AC power conversion method comprising:
   connecting a low-frequency bridge-type power converter and a high-frequency bridge-type power converter between a DC power source circuit and a distribution power system;
   providing a first AC terminal and a first DC bus of the low-frequency bridge-type power converter and a second AC terminal and a second DC bus of the high-frequency bridge-type power converter, and serially connecting the first AC terminal of the low-frequency bridge-type power converter to the second AC terminal of the high-frequency bridge-type power converter;
   operating the low-frequency bridge-type power converter with a switching frequency synchronous and identical with a frequency of an AC voltage of the distribution power system;
   operating the high-frequency bridge-type power converter with a high-frequency PWM to generate a multi-level AC voltage from the cascade bridge-type DC-AC power converter device, wherein the low-frequency bridge-type power converter is selected from a three-phase multi-level power converter and the high-frequency bridge-type power converter includes three single-phase full-bridge power converters, with a voltage of the second DC bus of the high-frequency bridge-type power converter higher than or equals a one-fourth voltage of the first DC bus of the low-frequency bridge-type power converter, with a switching frequency of power electronic switches of the low-frequency bridge-type power converter synchronized with a frequency of a three-phase fourth-wire distribution power system to thereby generate a three-phase four-wire AC voltage.

6. The cascade bridge-type DC-AC power conversion method as defined in claim 1, wherein one second DC bus of a single-phase full-bridge power converter or two or three second DC buses of two or three single-phase full-bridge power converters of the high-frequency bridge-type power converter only connect to capacitors which are performed as power buffers.

7. The cascade bridge-type DC-AC power conversion method as defined in claim 1, wherein the high-frequency bridge-type power converter is controlled by unipolar PWM for switching power electronic switches of the high-frequency bridge-type power converter with a high frequency to thereby generate a high-frequency three-level pulse voltage.

8. A cascade bridge-type DC-AC power converter device comprising:
- a low-frequency bridge-type power converter including a first AC terminal and a first DC bus, with the low-frequency bridge-type power converter having a first connection point, a second connection point and a third connection point of the first AC terminal; and
- a high-frequency bridge-type power converter including a second AC terminal and a second DC bus, with serially connecting the first AC terminal of the low-frequency bridge-type power converter to the second AC terminal of the high-frequency bridge-type power converter;
- wherein the high-frequency bridge-type power converter consists of two single-phase full-bridge power converters, with each of the two single-phase full-bridge power converters having a first connection point and a second connection point of the second AC terminal, with each first connection point of the second AC terminal connecting with an AC output port via a filter circuit;
- wherein the low-frequency bridge-type power converter is synchronously operated with a switching frequency identical with a frequency of an AC voltage of the distribution power system and the high-frequency bridge-type power converter is operated with a high-frequency PWM to generate a multi-level AC voltage from the cascade bridge-type DC-AC power converter device; and
- wherein the first connection point and the second connection point of the first AC terminal of the low-frequency power converter selectively connect with the second connection points of the two single-phase full-bridge power converters of the second AC terminal of the high-frequency bridge-type power converter while the third connection point of the low-frequency power converter selectively connects with the AC output port via the filter circuit.

9. A cascade bridge-type DC-AC power converter device comprising:
- a low-frequency bridge-type power converter including a first AC terminal and a first DC bus; and
- a high-frequency bridge-type power converter including a second AC terminal and a second DC bus, with serially connecting the first AC terminal of the low-frequency bridge-type power converter to the second AC terminal of the high-frequency bridge-type power converter;
- wherein the low-frequency bridge-type power converter is synchronously operated with a switching frequency identical with a frequency of an AC voltage of the distribution power system and the high-frequency bridge-type power converter is operated with a high-frequency PWM to generate a multi-level AC voltage from the cascade bridge-type DC-AC power converter device;
- wherein a voltage of the second DC bus of the high-frequency bridge-type power converter is controlled to adjust a voltage of the first DC bus of the low-frequency bridge-type power converter and thus to control an amplitude of an output current of the cascade bridge-type DC-AC power converter device and appropriately arranged values of the voltages of the first DC bus of the low-frequency bridge-type power converter and the second DC bus of the high-frequency bridge-type power converter; and
- wherein no real power is input or output at the high-frequency bridge-type power converter.

10. The cascade bridge-type DC-AC power converter device as defined in claim 8, wherein the cascade bridge-type DC-AC power converter device is applied to a single DC power source circuit.

11. The cascade bridge-type DC-AC power converter device as defined in claim 9, wherein the low-frequency bridge-type power converter and the high-frequency bridge-type power converter are selected from a single-phase full-bridge power converter, with a voltage of the second DC bus of the high-frequency bridge-type power converter higher than or equals a half voltage of the first DC bus of the low-frequency bridge-type power converter, with a switching frequency of power electronic switches of the low-frequency bridge-type power converter synchronized with a frequency of a single-phase distribution power system to thereby generate a single-phase AC voltage.

12. The cascade bridge-type DC-AC power converter device as defined in claim 9, wherein the low-frequency bridge-type power converter is selected from a three-phase bridge-type power converter and the high-frequency bridge-type power converter includes two or three single-phase full-bridge power converters, with a voltage of the second DC bus of the high-frequency bridge-type power converter higher than or equals an one-third voltage of the first DC bus of the low-frequency bridge-type power converter, with a switching frequency of power electronic switches of the low-frequency bridge-type power converter synchronized with a frequency of a three-phase three-wire distribution power system to thereby generate a three-phase three-wire AC voltage.

13. A cascade bridge-type DC-AC power converter device comprising:
- a low-frequency bridge-type power converter including a first AC terminal and a first DC bus; and
- a high-frequency bridge-type power converter including a second AC terminal and a second DC bus, with serially connecting the first AC terminal of the low-frequency bridge-type power converter to the second AC terminal of the high-frequency bridge-type power converter;
- wherein the low-frequency bridge-type power converter is synchronously operated with a switching frequency identical with a frequency of an AC voltage of the distribution power system and the high-frequency bridge-type power converter is operated with a high-frequency PWM to generate a multi-level AC voltage from the cascade bridge-type DC-AC power converter device; and
- wherein the low-frequency bridge-type power converter is selected from a three-phase multi-level power converter and the high-frequency bridge-type power converter includes three single-phase full-bridge power converters, with a voltage of the second DC bus of the high-frequency bridge-type power converter higher than or equals an one-fourth voltage of the first DC bus of the low-frequency bridge-type power converter, with a switching frequency of power electronic switches of the low-frequency bridge-type power converter synchronized with a frequency of a three-phase fourth-wire distribution power system to thereby generate a three-phase four-wire AC voltage.

14. The cascade bridge-type DC-AC power converter device as defined in claim 9, wherein one second DC bus of a single-phase full-bridge power converter or two or three second DC buses of two or three single-phase full-bridge power converters of the high-frequency bridge-type power converter only connect to capacitors which are performed as power buffers.

15. The cascade bridge-type DC-AC power converter device as defined in claim 8, wherein power electronic switches of the high-frequency bridge-type power converter are controlled by unipolar PWM to thereby generate a high-frequency three-level pulse voltage.

16. The cascade bridge-type DC-AC power converter device as defined in claim 9, wherein the cascade bridge-type DC-AC power converter device includes a DC input port and an AC output port, with the DC input port connecting to a DC power source circuit and the AC output port connecting to a distribution power system.

17. A cascade bridge-type DC-AC power converter device comprising:
- a low-frequency bridge-type power converter including a first AC terminal and a first DC bus, with the low-frequency bridge-type power converter having a first connection point, a second connection point, a third connection point and a fourth connection point of the first AC terminal; and
- a high-frequency bridge-type power converter including a second AC terminal and a second DC bus, with serially connecting the first AC terminal of the low-frequency bridge-type power converter to the second AC terminal of the high-frequency bridge-type power converter, with the high-frequency bridge-type power converter including three single-phase full-bridge power converters, with each of the three single-phase full-bridge power converters having a first connection point and a second connection point of the second AC terminal, with each of the first connection points of the second AC terminal connecting with an AC output port via a filter circuit;
- wherein the low-frequency bridge-type power converter is synchronously operated with a switching frequency identical with a frequency of an AC voltage of the distribution power system and the high-frequency bridge-type power converter is operated with a high-frequency PWM to generate a multi-level AC voltage from the cascade bridge-type DC-AC power converter device;
- wherein the first connection point, the second connection point and the third connection point of the first AC terminal of the low-frequency power converter selectively connect with the second connection points of the three single-phase full-bridge power converters of the second AC terminal of the high-frequency bridge-type power converter; and
- wherein the fourth connection point of the first AC terminal of the low-frequency power converter connects with a neutral line of a three-phase four-wire distribution power system via the filter circuit and the low-frequency power converter further includes two DC capacitors whose serial connection point further connects with the fourth connection point.

18. The cascade bridge-type DC-AC power converter device as defined in claim 17, wherein a voltage of the second DC bus of the high-frequency bridge-type power converter is controlled to adjust a voltage of the first DC bus of the low-frequency bridge-type power converter and to control an amplitude of an output current and to match values of the voltages of the first DC bus of the low-frequency bridge-type power converter with the second DC bus of the high-frequency bridge-type power converter, and wherein no real power is input or output at the high-frequency bridge-type power converter.

19. The cascade bridge-type DC-AC power converter device as defined in claim 17, wherein one second DC bus of the three single-phase full-bridge power converters of the high-frequency bridge-type power converter only connect to capacitors which are performed as power buffers.

20. The cascade bridge-type DC-AC power converter device as defined in claim 17, wherein the low-frequency bridge-type power converter is a three-phase diode-clamping multi-level power converter.

* * * * *